US009582067B2

(12) United States Patent
Hirai

(10) Patent No.: US 9,582,067 B2
(45) Date of Patent: Feb. 28, 2017

(54) INFORMATION PROCESSING APPARATUS, METHOD AND COMPUTER-READABLE STORAGE MEDIUM FOR POWER CONTROL UNDER A PLURALITY OF POWER MODES INCLUDING AN UNSUPPORTED POWER MODE

(71) Applicant: Kohichi Hirai, Kanagawa (JP)

(72) Inventor: Kohichi Hirai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 447 days.

(21) Appl. No.: 14/024,791

(22) Filed: Sep. 12, 2013

(65) Prior Publication Data

US 2014/0082395 A1    Mar. 20, 2014

(30) Foreign Application Priority Data

Sep. 18, 2012    (JP) .................................. 2012-204678
Sep. 4, 2013    (JP) .................................. 2013-183465

(51) Int. Cl.
G06F 1/32    (2006.01)
G06F 1/26    (2006.01)
H04N 1/00    (2006.01)

(52) U.S. Cl.
CPC ............ G06F 1/3287 (2013.01); G06F 1/266 (2013.01); H04N 1/00896 (2013.01);
(Continued)

(58) Field of Classification Search
CPC ........... H04N 1/00896; H04N 1/00904; H04N 2201/0094; Y02B 60/32; Y02B 60/1282
See application file for complete search history.

(56) References Cited

U.S. PATENT DOCUMENTS

2003/0065497 A1*    4/2003    Rhoads .................. G06F 1/263
                                                                        703/18
2004/0003300 A1*    1/2004    Malueg ................ G06F 1/3203
                                                                        713/300
(Continued)

FOREIGN PATENT DOCUMENTS

JP    2006-148876    6/2006
JP    2006-330843    12/2006
(Continued)

*Primary Examiner* — Chun Cao
*Assistant Examiner* — Danny Chan
(74) *Attorney, Agent, or Firm* — Oblon, McClelland, Maier & Neustadt, L.L.P.

(57) ABSTRACT

An information processing apparatus includes an application program; a power control unit configured to switch power modes so as to control ON/OFF of power supply to each piece of hardware; and a function execution unit configured to execute control of a specified function based on an instruction from the application program. The function execution unit is configured to inquire at the power control unit for the power modes in response to an instruction from the application program. The power control unit is configured to return a power mode to the function execution unit. The function execution unit is configured to notify the power control unit of a recovery request for powering ON the hardware that has been powered OFF in the power mode not supported.

20 Claims, 5 Drawing Sheets

(52) U.S. Cl.
CPC . *H04N 1/00904* (2013.01); *H04N 2201/0094* (2013.01); *Y02B 60/1282* (2013.01); *Y02B 60/32* (2013.01)

(56) References Cited

U.S. PATENT DOCUMENTS

| | | | |
|---|---|---|---|
| 2004/0123172 A1* | 6/2004 | Sheller | G06F 1/3203 713/323 |
| 2004/0153676 A1* | 8/2004 | Krantz | G06F 1/3203 713/300 |
| 2004/0162922 A1* | 8/2004 | Kardach | G06F 1/3203 710/15 |
| 2006/0082801 A1 | 4/2006 | Ohishi | |
| 2006/0224905 A1* | 10/2006 | Plante | G06F 1/3203 713/300 |
| 2008/0215871 A1* | 9/2008 | Chan | G06F 13/4081 713/2 |
| 2010/0235775 A1* | 9/2010 | Sugimoto | H04N 1/00411 715/772 |
| 2011/0283130 A1* | 11/2011 | Pai | G06F 1/26 713/330 |
| 2013/0036420 A1 | 2/2013 | Ohishi | |
| 2013/0185318 A1 | 7/2013 | Hirai | |

FOREIGN PATENT DOCUMENTS

| | | |
|---|---|---|
| JP | 2010-063090 | 3/2010 |
| JP | 4517274 | 5/2010 |

* cited by examiner

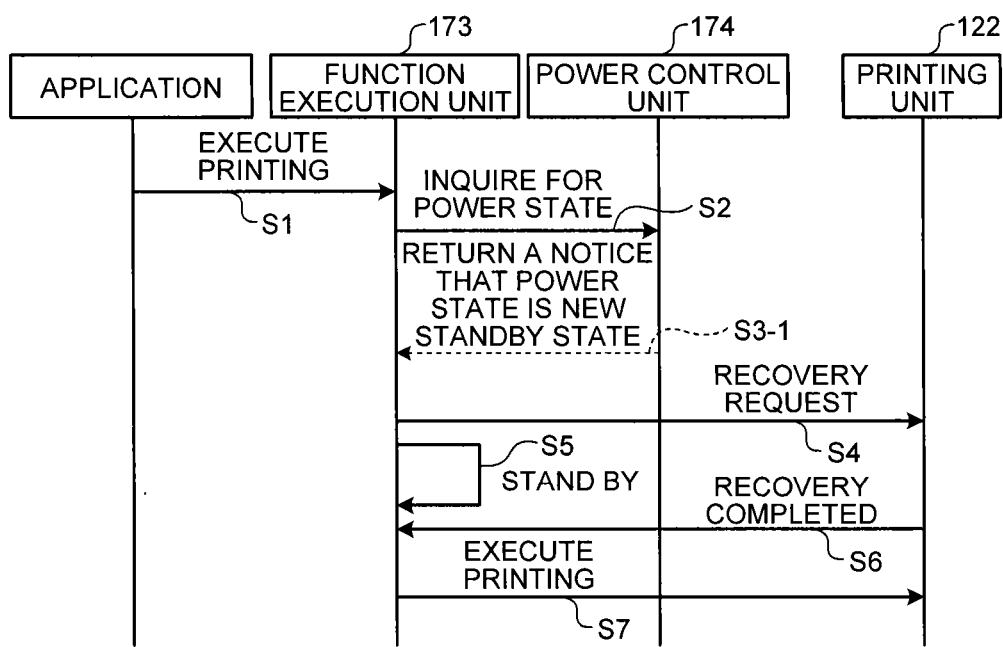

|  | OPERATION PANEL | PRINTING UNIT | SCANNING UNIT |
|---|---|---|---|
| STANDBY STATE | ON | ON | ON |
| POWER SAVING STATE | OFF | OFF | OFF |
| NEW STANDBY STATE | ON | OFF | OFF |
| SECOND STANDBY STATE | OFF | ON | OFF |

INFORMATION PROCESSING APPARATUS, METHOD AND COMPUTER-READABLE STORAGE MEDIUM FOR POWER CONTROL UNDER A PLURALITY OF POWER MODES INCLUDING AN UNSUPPORTED POWER MODE

CROSS-REFERENCE TO RELATED APPLICATIONS

The present application claims priority to and incorporates by reference the entire contents of Japanese Patent Application No. 2012-204678 filed in Japan on Sep. 18, 2012 and Japanese Patent Application No. 2013-183465 filed in Japan on Sep. 4, 2013.

BACKGROUND OF THE INVENTION

1. Field of the Invention

The present invention relates to an information processing apparatus, a power control method, and a computer-readable storage medium.

2. Description of the Related Art

In image forming apparatuses, a power saving mode is set for reducing a power consumption amount in a standby state where no operation is performed. In the power saving mode, electric power is supplied to only parts that require it and is not supplied to other parts among the respective parts constituting the image forming apparatus so as to suppress the power consumption amount.

Furthermore, in the recent image forming apparatuses, provided is a development environment such as a software development kit (SDK) for development of application programs as disclosed in Japanese Patent Application Laid-open No. 2006-148876. The application programs are made to operate on a common middleware, so that cooperation among the application programs and the development speed are improved. In addition, application programs for controlling power saving as described above have been developed by the SDK.

In the case of the application program produced by the above-mentioned SDK, there is requirement that common functions are desired to be installed in all models. When a power saving mode that is not installed in the past application program becomes capable of being set to a new device, the device cannot respond to the power saving mode appropriately in some cases because the application program are not updated for individual devices. For example, there has been a possibility that troubles are generated on operations as follows. That is, a processing method is not figured out even if the power saving mode that is not supported by the application program is notified, or there arises a difference between a power state in the device and a power state grasped by the application program. The problem arises not only on the application program provided in the development environment of the SDK as the provision mode but also on application programs developed for being newly installed in image forming apparatuses and other devices. Furthermore, it can be said that the problem can arise on various devices other than the image forming apparatuses.

Therefore, there is a need to provide an information processing apparatus capable of operating the apparatus normally even in a power saving mode that is not installed in an application program.

SUMMARY OF THE INVENTION

It is an object of the present invention to at least partially solve the problems in the conventional technology.

According to an embodiment, there is provided an information processing apparatus that includes an application program; a power control unit configured to switch a plurality of power modes so as to control ON/OFF of power supply to each piece of hardware; and a function execution unit configured to execute control of a specified function among functions for executing control on the hardware in accordance with an instruction from the application program. The function execution unit is configured to inquire at the power control unit for the power modes in response to an instruction from the application program. The power control unit is configured to return any one of the power modes to the function execution unit. The function execution unit is configured to notify the power control unit of a recovery request for powering ON the hardware that has been powered OFF in the any one of the power modes when the any one of the power modes is not supported and when a control instruction to the hardware that has been powered OFF in the any one of the power modes is received from the application program.

According to another embodiment, there is provided a power control method for controlling an information processing apparatus that includes an application program, a power control unit configured to switch a plurality of power modes so as to control ON/OFF of power supply to each piece of hardware, and a function execution unit configured to execute control of a specified function among functions for executing control on the hardware in accordance with an instruction from the application program. The power control method includes inquiring, by the function execution unit, at the power control unit for the power modes in response to an instruction from the application program; returning, by the power control unit, any one of the power modes to the function execution unit; and notifying, by the function execution unit, the power control unit of a recovery request for powering ON the hardware that has been powered OFF in the any one of the power modes when the any one of the power modes is not supported and when a control instruction to the hardware that has been powered OFF in the any one of the power modes is received from the application program.

According to still another embodiment, there is provided a non-transitory computer-readable storage medium with an executable program stored thereon and executed by a computer of an information processing apparatus that includes an application program, a power control unit configured to switch a plurality of power modes so as to control ON/OFF of power supply to each piece of hardware, and a function execution unit configured to execute control of a specified function among functions for executing control on the hardware in accordance with an instruction from the application program. The program instructs the computer to perform: inquiring, by the function execution unit, at the power control unit for the power modes in response to an instruction from the application program; returning, by the power control unit, any one of the power modes to the function execution unit; and notifying, by the function execution unit, the power control unit of a recovery request for powering ON the hardware that has been powered OFF in the any one of the power modes when the any one of the power modes is not supported and when a control instruction to the hardware that has been powered OFF in the any one of the power modes is received from the application program.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a table illustrating an example of power modes in the embodiment;

FIG. 6 is a flowchart illustrating the procedure of printing processing in a new standby state in the embodiment;

DETAILED DESCRIPTION OF THE PREFERRED EMBODIMENTS

Figure 1:
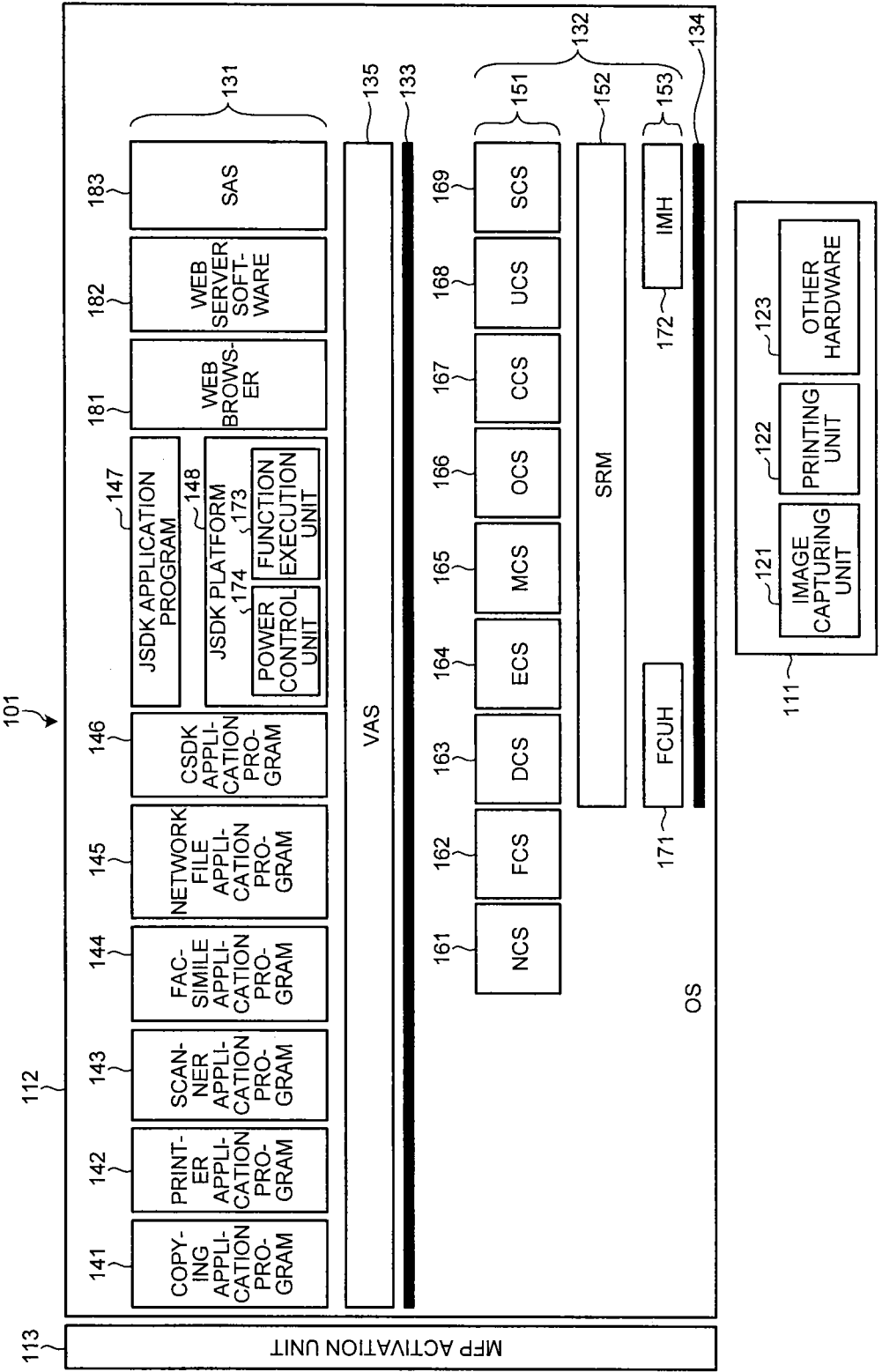
FIG. 1 is a diagram illustrating a multifunction peripheral (MFP) according to an embodiment.

FIG. 1 illustrates an MFP 101 to which an information processing apparatus according to an embodiment of the invention is embodied. The MFP 101 as illustrated in FIG. 1 includes various types of hardware 111, various types of software 112, and an MFP activation unit 113.

The hardware 111 of the MFP 101 includes an image capturing unit 121, a printing unit 122, and other hardware 123. The image capturing unit 121 is a piece of hardware for scanning an image (image data) from a scan document. The printing unit 122 is a piece of hardware for printing the image (image data) on print paper.

The software 112 of the MFP 101 includes various application programs 131 and various platforms 132. These programs are executed in parallel on a process basis by an operating system (OS) such as the UNIX (registered trademark).

The application programs 131 include a copying application program 141 as an application program for copying, a printer application program 142 as an application program for a printer, a scanner application program 143 as an application program for a scanner, a facsimile application program 144 as an application program for a facsimile, and a network file application program 145 as an application program for a network file. Furthermore, the application programs 131 include a Web browser 181 as software for browsing Web pages, Web server software 182 as software for distributing the Web pages, and an SDK application service (SAS) 183 as software for controlling a client software development kit (CSDK) application program 146 and a Java servlet development kit (JSDK) application program 147.

The application programs 131 can be developed by using dedicated software development kits (SDKs). The application programs 131 developed by using the SDKs are referred to as SDK application programs. As the dedicated SDKs, provided are a "CSDK" for developing the application program 131 with the C language and a "JSDK" for developing the application program 131 with the Java (registered trademark) language. The application program 131 developed by using the CSDK is referred to as a CSDK application program and the application program 131 developed by using the JSDK is referred to as a JSDK application program. The MFP 101 as illustrated in FIG. 1 also includes the CSDK application program 146 and the JSDK application program 147. The MFP 101 as illustrated in FIG. 1 further includes a JSDK platform 148 as the software 112 that intermediates between the JSDK application program 147 described with the Java (registered trademark) language and other software 112 described with the C language. The JSDK platform 148 is provided with a function execution unit 173 and a power control unit 174.

The platforms 132 include various control services 151, a system resource manager 152, and various handlers 153. The control services 151 include a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169. The handlers 153 include a facsimile control unit handler (FCUH) 171 and an image memory handler (IMH) 172.

The process of the NCS 161 intermediates network communication. The process of the FCS 162 provides an application programming interface (API) for the facsimile. The process of the DCS 163 performs control relating to distribution processing of accumulated documents. The process of the ECS 164 performs control relating to the image capturing unit 121 and the printing unit 122. The process of the MCS 165 performs control relating to a memory and a hard disk drive. The process of the OCS 166 performs control relating to an operation panel. The process of the CCS 167 performs control relating to authentication processing and billing processing. The process of the UCS 168 performs control relating to management of user information. The process of the SCS 169 performs control relating to management of the system.

The function execution unit 173 is a platform for executing control of a specified function among functions for executing control on the hardware 111 in accordance with an instruction from each application program 131. The function execution unit 173 also performs, for example, control relating to printing processing and control relating to scanning.

The power control unit 174 switches a plurality of power modes so as to control ON/OFF of power supply to each piece of hardware 111 through the corresponding SCS 169.

The software 112 that intermediates between the application programs 131 and the platforms 132 includes a virtual application service (VAS) 135. The VAS 135 operates as a server process for the application programs 131 functioning as clients and operates as a client process for the platforms 132 functioning as servers. The VAS 135 has a wrapping function of hiding the platforms 132 from the application programs 131 and plays a role in absorbing version differences with version upgrade of the platforms 132.

The MFP activation unit 113 is executed first when the MFP 101 is powered ON. With this, the OS such as UNIX (registered trademark) is activated and the application programs 131 and the platforms 132 are activated. These programs are accumulated in the hard disk drive or the memory card. Furthermore, these programs are reproduced from the hard disk drive or the memory card so as to be activated on the memory.

Figure 2:
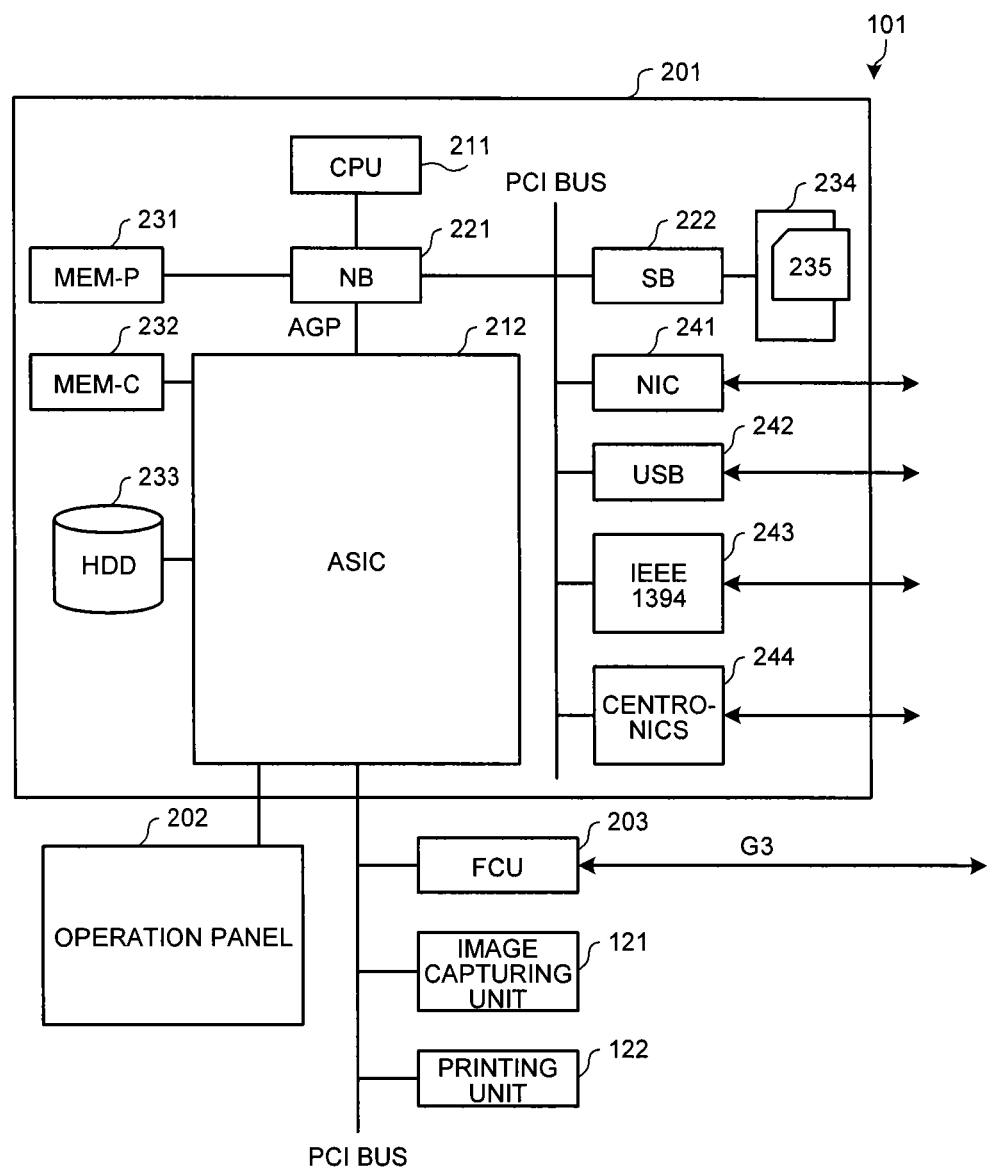
FIG. 2 is a diagram illustrating a hardware configuration relating to the MFP in the embodiment.

FIG. 2 is a diagram illustrating a hardware configuration relating to the MFP 101 in FIG. 1. The hardware 111 of the MFP 101 includes a controller 201, an operation panel 202, a facsimile control unit (FCU) 203, the image capturing unit 121, and the printing unit 122.

The controller 201 is constituted by a central processing unit (CPU) 211, an application specific integrated circuit (ASIC) 212, a north bridge (NB) 221, a south bridge (SB) 222, an MEM-P 231, an MEM-C 232, a hard disk drive (HDD) 233, a memory card slot 234, a network interface controller (NIC) 241, a universal serial bus (USB) device 242, an IEEE1394 device 243, and a Centronics device 244.

The CPU 211 is an integrated circuit (IC) for processing various pieces of information. The ASIC 212 is an IC for processing various images. The NB 221 is a north bridge for the controller 201. The SB 222 is a south bridge for the controller 201. The MEM-P 231 is a system memory for the MFP 101. The MEM-C 232 is a local memory for the MFP 101. The HDD 233 is a storage of the MFP 101. The memory card slot 234 is a slot for setting the memory card 235. The NIC 241 is a controller for network communication with MAC addresses. The USB device 242 is a device for providing connection terminals of the USB standard. The IEEE1394 device 243 is a device for providing connection terminals of the IEEE1394 standard. The Centronics device 244 is a device for providing connection terminals of the Centronics specification.

The operation panel 202 is a piece of hardware (an operating unit) allowing an operator to input data to the MFP 101 and hardware (a display unit) allowing the operator to obtain output from the MFP 101.

Figure 3:
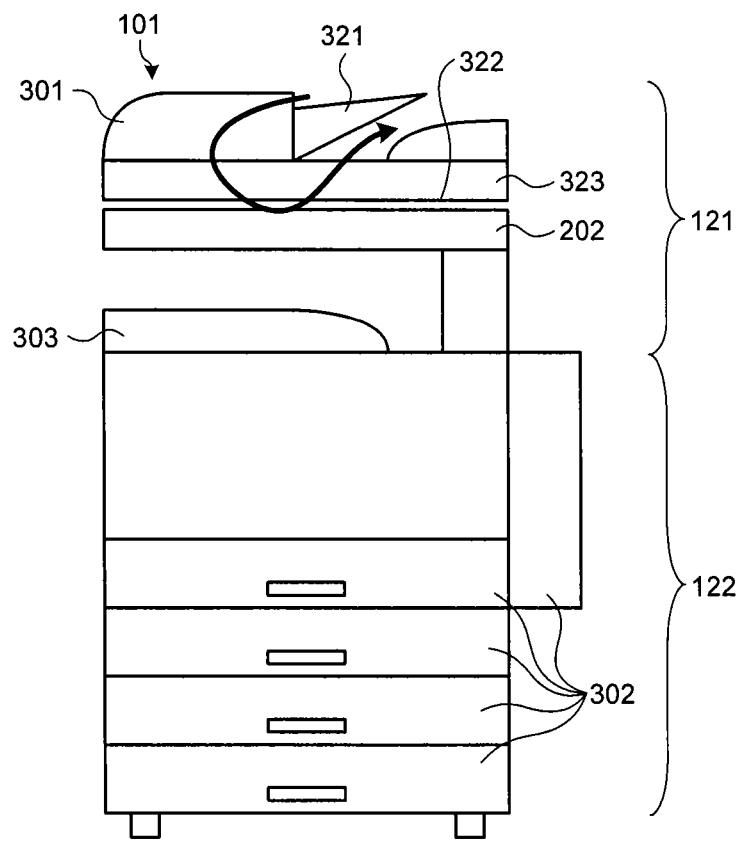
FIG. 3 is a view illustrating an outer appearance of the MFP in the embodiment.

FIG. 3 is a view illustrating an outer appearance relating to the MFP 101 as illustrated in FIG. 1. FIG. 3 illustrates a position of the image capturing unit 121, a position of the printing unit 122, and a position of the operation panel 202. Furthermore, FIG. 3 illustrates a document setting unit 301, a paper feeding unit 302, and a discharging unit 303. A scan document is set onto the document setting unit 301. Print paper is fed from the paper feeding unit 302. The print paper is discharged to the discharging unit 303.

Figure 4:
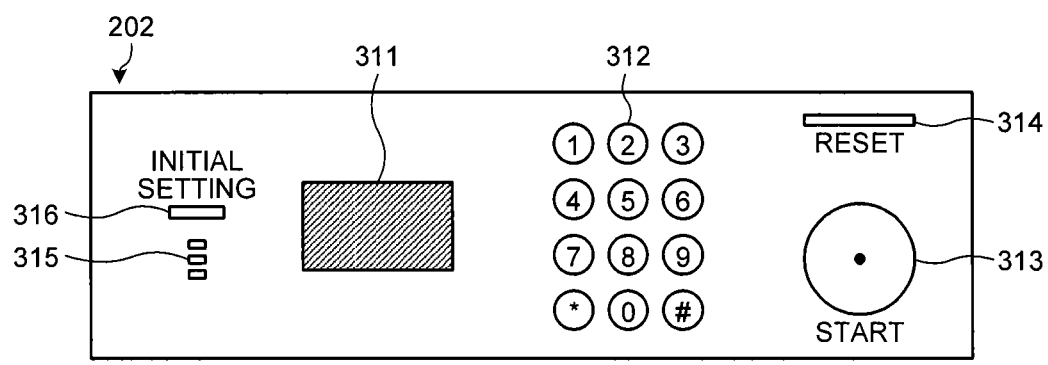
FIG. 4 is a view illustrating an operation panel.

As illustrated in FIG. 4, the operation panel 202 is constituted by a touch panel 311, a numeric keypad 312, a start button 313, a reset button 314, a function key 315, and an initial setting button 316. The touch panel 311 is a piece of hardware (a touch operating unit) for performing input with a touch operation and also hardware (a screen display unit) for obtaining output with screen display. The numeric keypad 312 is a piece of hardware for performing numerical input with a key (button) operation. The start button 313 is a piece of hardware for performing a start operation with a button operation. The reset button 314 is a piece of hardware for performing a reset operation with a button operation. The function key 315 is a piece of hardware for displaying an operation screen provided by the CSDK application program 146 or the JSDK application program 147 with a key (button) operation. The initial setting button 316 is a piece of hardware for displaying an initial setting screen with a button operation.

The document setting unit 301 is constituted by an automatic document feeder (ADF) 321, a flatbed 322, and a flatbed cover 323. The paper feeding unit 302 is constituted by four paper feed trays. The discharging unit 303 is constituted by one discharge tray. A plurality of scan documents can be set onto the ADF 321 in a staked manner. The scan document is set onto the flatbed 322 while the front surface thereof faces downward.

FIG. 5 is a table illustrating combinations of the power modes that are managed by the above-mentioned power control unit 174. In the embodiment, the power modes are defined by the combination of ON/OFF of power supply to the operation panel 202 and the printing unit 122. The combination can be changed by including another piece of hardware appropriately. As illustrated in FIG. 5, there are three types of power modes including a standby state, a power saving state, and a new standby state. In the standby state, the operation panel 202 is in the ON state and the printing unit 122 is in the ON state. In the power saving state, the operation panel 202 in the OFF state and the printing unit 122 is in the OFF state. In the new standby state, the operation panel 202 is in the ON state and the printing unit 122 is in the OFF state. The standby state is a state where printing processing can be started immediately when a print instruction is made. The power mode shifts to the power saving state when processing has not been performed on the apparatus for a constant period of time, for example. In this case, power supply is not also supplied to the operation panel 202. Based on this, it is easy for a user to grasp a fact that the current state is the power saving state and is required to perform some operation once so as to recover to the standby state from the power saving state.

Furthermore, the new standby state is a power mode that is newly set to the MFP 101 and the respective application programs 131 do not support the new standby state. Furthermore, the operation panel 202 is operated in the new standby state. Based on this, in the new standby state, a user tends to think that operations can be performed in the same manner as in the standby state. For this reason, a user issues a print instruction through the application program 131 in many cases in the new standby state. Described is processing for performing appropriate processing in the new standby state in that case with reference to FIG. 6.

As illustrated in FIG. 6, the CSDK application program 146 or the JSDK application program 147 transmits a printing execution instruction to the function execution unit 173 first (Step S1). Then, the function execution unit 173 inquiries at the power control unit 174 for the power state (power mode) (Step S2). The power control unit 174 returns a notice that the current power mode is the new standby state to the function execution unit 173 (Step S3-1). The application program 131 is notified of the standby state because it cannot recognize the new standby state. On the other hand, standby recover processing is performed so as to prevent mismatch of information on the application program 131.

Subsequently, if the function execution unit 173 receives a return indicating that the current power mode is the new standby state, the function execution unit 173 directs to apply power to the printing unit 122 through the power control unit 174 so as to make a recovery request (Step S4). Then, the function execution unit 173 stands by until it receives a return indicating that the recovery is completed from the printing unit 122 (Steps S5 and S6). If the printing unit 122 is recovered, the function execution unit 173 instructs the printing unit 122 to execute printing (Step S7).

In the MFP 101 according to the above-mentioned embodiment, when the application program 131 issues a control instruction to the printing unit 122 to which power supply is turned OFF in the power mode that is not installed, the power control unit 174 turns ON the power supply to the printing unit 122 and the function execution unit 173 executes printing processing after the power supply to the printing unit 122 is turned ON. That is to say, even when the application program 131 issues a control instruction in a state where power is not applied to the hardware, the processing is performed after the hardware is recovered to the state where printing can be executed, thereby operating the apparatus normally.

Furthermore, the application program 131 is not notified of the new standby state that is not installed therein and is notified of the standby state that is installed therein. This makes it possible to prevent generation of abnormal behaviors on the application program 131 due to the notification that is not defined.

The invention can be applied to image processing apparatuses, copying machines, projectors, personal computers (PCs), and the like that have the power saving mode and include the application program 131 produced by the SDK or the like, in addition to the MFP 101.

Modification

Figures 7, 8:
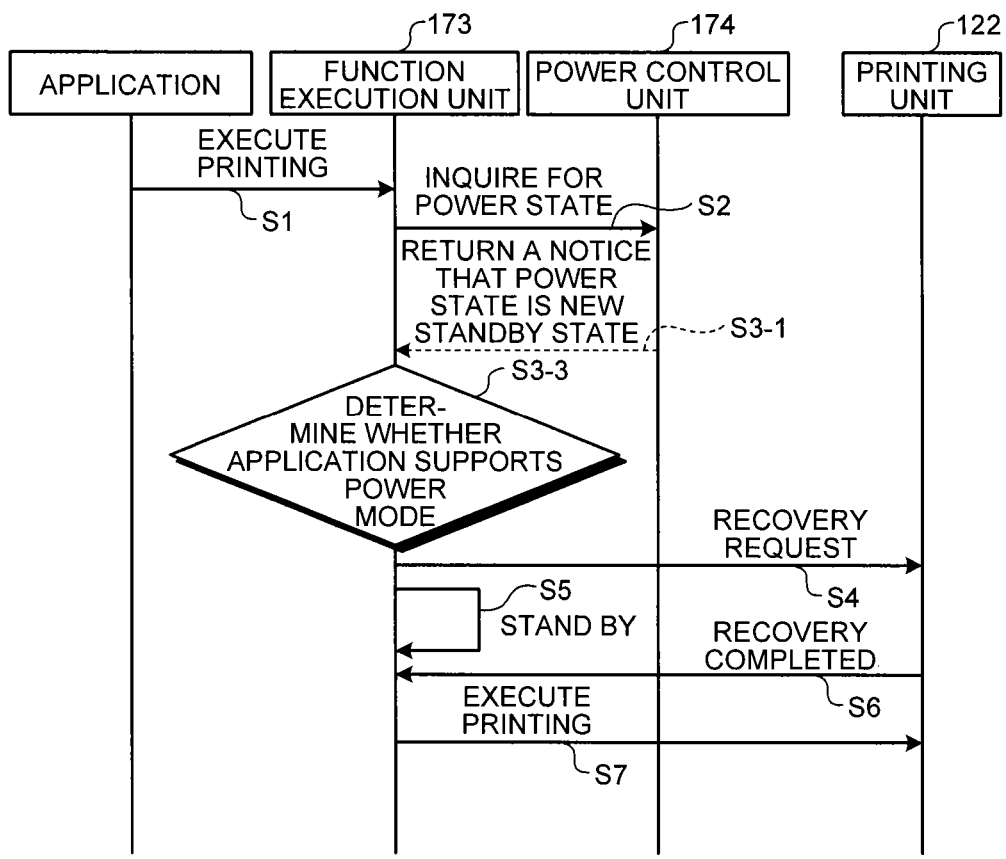
FIG. 7 is a table illustrating an example of power modes according to a modification of the embodiment.
FIG. 8 is a flowchart illustrating the procedure of printing processing in a new standby state in the modification of the embodiment.

Furthermore, the combination of the power supply states in the new standby state and target devices can be also changed appropriately. For example, FIG. 7 is a table illustrating another combination of the power modes. In FIG. 7, a combination of the ON/OFF states of the power supply of the scanning unit that scans new sheet data is added. Furthermore, in a second standby state, the printing unit is in the ON state, and the operation panel and the scanning unit are in the OFF states. It is considered that the power mode is made into the second standby state when only print data is transmitted, for example.

FIG. 8 is a flowchart illustrating the procedure of processing of notification of a power mode in an information processing apparatus according to the modification. The processing in FIG. 8 is different from the processing in FIG. 6 at Steps S3-3 and S3-4. At Step S3-3, the function execution unit 173 determines whether the application program supports the power mode notified from the power control unit 174 first (Step S3-3). When it is determined that the application program does not support the power mode, the function execution unit 173 transmits a recovery request to the printing unit 122 through the power control unit 174 to perform printing without notifying the application program of the recovery request (Step S4). In this manner, the function control unit 173 intermediates between the application program and the power control unit 174 so as to control to perform processing desired by the application program even in the power mode that is not supported by the application program.

The information processing apparatus according to each of the above-mentioned embodiments includes a control device such as a CPU, a storage device such as a read only memory (ROM) and a random access memory (RAM), an external storage device such as an HDD and a CD drive device, a display device such as a display, and an input device such as a keyboard and a mouse, and has a hardware configuration by using a normal computer.

Programs to be executed on the information processing apparatus according to each of the above-mentioned embodiments are provided by being recorded in a storage medium that can be read by a computer, such as a compact disc read only memory (CD-ROM), a flexible disk (FD), a CD recordable (CD-R), or a digital versatile disk (DVD), in a format that can be installed or a file that can be executed.

The programs to be executed on the information processing apparatus according to each of the above-mentioned embodiments may be configured to be provided by being stored on a computer connected to network such as the Internet and being downloaded through the network. Alternatively, the programs to be executed on the information processing apparatus according to each of the above-mentioned embodiments may be configured to be provided or distributed through network such as the Internet.

Furthermore, the program in each of the above-mentioned embodiments may be configured to be provided by being incorporated in a ROM previously.

The programs to be executed on the information processing apparatus according to each of the above-mentioned embodiments have a module configuration including the above-mentioned respective parts. As actual hardware, a central processing unit (CPU) (processor) loads the programs from the above-mentioned storage medium and executes the programs, so that the above-mentioned parts are loaded on a main storage device. With this, the above-mentioned parts are generated on the main storage device.

According to the embodiments, it is possible to provide an effect that the device can be operated normally even in a power saving mode that is not installed in an application program.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
an application program;
power control circuitry configured to switch a plurality of power modes, each indicating a combination of ON/OFF states of power supply to a plurality of pieces of hardware, each combination including a separate ON/OFF state for each of the plurality of pieces of hardware whose power supply is controlled by the power control circuitry and the plurality of power modes including at least a first power mode supported by the application and a second power mode not supported by the application; and
function execution circuitry configured to execute control of a specified function, among a plurality of functions for executing control on the plurality of pieces of hardware, in accordance with an instruction from the application program, wherein
the function execution circuitry is configured to inquire at the power control circuitry for a power mode of the plurality of power modes in response to an instruction from the application program,
the power control circuitry is configured to return any one of the plurality of power modes to the function execution circuitry, and
the function execution circuitry is configured to:
notify the application of the any one of the plurality of power modes when the any one of the plurality of power modes indicates the first power mode, and
notify the power control circuitry of a recovery request for powering ON a piece of hardware that has been powered OFF in the any one of the plurality of power modes without notifying the application of the any one of the plurality of power modes when the any one of the plurality of power modes indicates the second power mode and when a control instruction to the piece of hardware that has been powered OFF in the any one of the plurality of power modes is received from the application program.

2. The information processing apparatus according to claim 1, wherein the function execution circuitry is configured to notify the power control circuitry that the application program does not support the any one of the plurality of power modes.

3. The information processing apparatus according to claim 1, wherein the function execution circuitry is configured to cause the piece of hardware to execute a control instruction after the piece of hardware has been powered ON when the control instruction is received from the application program, the control instruction being for powering OFF the piece of hardware when the any one of the plurality of power modes indicates the second power mode.

4. The information processing apparatus according to claim 1, wherein
the power control circuitry is configured to select one of the plurality of power modes that include a standby mode where power supply to an operation panel and a printer is in an ON state, a first power saving mode where power supply to the operation panel and the printer is in an OFF state, and a second power saving mode where power supply to the operation panel is in the ON state and power supply to the printer is in the OFF state,
the first power mode includes one of the standby mode and the first power saving mode and the second power mode includes the second power saving mode, and
the power control circuitry is configured to notify the application program that the any one of the plurality of power modes is the standby mode when the any one of the plurality of power modes is the second power saving mode.

5. The information processing apparatus according to claim 1, further comprising:
a first piece of hardware out of the plurality of pieces of hardware, the first piece of hardware being configured to receive an operation from a user to operate the information processing apparatus; and
a second piece of hardware out of the plurality of pieces of hardware, the second piece of hardware configured to execute the specified function, wherein
the second power mode indicates that the first piece of hardware has been powered ON and that the second piece of hardware has been powered OFF.

6. The information processing apparatus according to claim 5, wherein
the information processing apparatus is configured to form an image,
the first piece of hardware is an operation panel, and
the second piece of hardware is one of a printer and a scanner.

7. The information processing apparatus according to claim 1, wherein the power control circuitry is configured to select one of the plurality of power modes that include a standby mode where power supply to an operation panel, a printer, and a scanner is in an ON state, a first power saving mode where power supply to the operation panel, the printer, and the scanner is in an OFF state, a second power saving mode where power supply to the operation panel is in the ON state and power supply to the printer and the scanner is in the OFF state, and a third power saving mode where power supply to the operation panel and the scanner is in the OFF state and power supply to the printer is in the ON state.

8. A power control method for controlling an information processing apparatus that includes an application program, a power control unit configured to switch a plurality of power modes, each indicating a combination of ON/OFF states of power supply to a plurality of pieces of hardware, each combination including a separate ON/OFF state for each of the plurality of pieces of hardware whose power supply is controlled by the power control circuitry, the plurality of power modes including at least a first power mode supported by the application and a second power mode not supported by the application, and a function execution unit configured to execute control of a specified function, among a plurality of functions for executing control on the plurality of pieces pf hardware, in accordance with an instruction from the application program, the power control method comprising:
inquiring, by the function execution unit, at the power control unit for a power mode of the plurality of power modes in response to an instruction from the application program;
returning, by the power control unit, any one of the plurality of power modes to the function execution unit;
notifying, by the function execution unit, the application of the any one of the plurality of power modes when the any one of the plurality of power modes indicates the first power mode; and
notifying, by the function execution unit, the power control unit of a recovery request for powering ON a piece of hardware that has been powered OFF in the any one of the plurality of power modes without notifying the application of the any one of the plurality of power modes when the any one of the plurality of power modes indicates the second power mode and when a control instruction to the piece of hardware that has been powered OFF in the any one of the plurality of power modes is received from the application program.

9. The power control method according to claim 8, wherein the notifying includes notifying the power control unit that the application program does not support the any one of the plurality of power modes.

10. The power control method according to claim 8, further comprising causing, by the function execution unit, the hardware to execute a control instruction after the piece of hardware has been powered ON when the control instruction is received from the application program, the control instruction being for powering OFF the piece of hardware when the any one of the plurality of power modes indicates the second power mode.

11. The power control method according to claim 8, further comprising selecting, by the power control unit, one of the plurality of power modes that include a standby mode where power supply to an operating unit and a printing unit for performing printing is in an ON state, a first power saving mode where power supply to the operating unit and the printing unit is in an OFF state, and a second power saving mode where power supply to the operating unit is in the ON state and power supply to the printing unit is in the OFF state, wherein
the first power mode includes one of the standby mode and the first power saving mode and the second power mode includes the second power saving mode, and
the power control method further comprises notifying, by the power control unit, the application program that the any one of the plurality of power modes is the standby mode when the any one of the plurality of power modes is the second power saving mode.

12. The power control method according to claim 8, further comprising:
receiving, by a first piece of hardware out of the plurality of pieces of hardware, an operation from a user to operate the information processing apparatus; and
executing, by a second piece of hardware out of the plurality of pieces of hardware, the specified function, wherein the second power mode indicates that the first piece of hardware has been powered ON and that the second piece of hardware has been powered OFF.

13. The power control method according to claim 12, wherein
the information processing apparatus is configured to form an image,
the first piece of hardware is an operation panel, and
the second piece of hardware is one of a printing unit and a scanning unit.

14. The power control method according to claim 8, further comprising selecting, by the power control unit, one of the plurality of power modes that include a standby mode where power supply to an operation panel, a printer, and a scanner is in an ON state, a first power saving mode where power supply to the operation panel, the printer, and the scanner is in an OFF state, a second power saving mode where power supply to the operation panel is in the ON state and power supply to the printer and the scanner is in the OFF state, and a third power saving mode where power supply to the operation panel and the scanner is in the OFF state and power supply to the printer is in the ON state.

15. A non-transitory computer-readable storage medium with an executable program stored thereon and executed by a computer of an information processing apparatus that includes an application program, a power control unit configured to switch a plurality of power modes, each indicating a combination of ON/OFF states of power supply to a plurality of pieces of hardware, each combination including a separate ON/OFF state for each of the plurality of pieces of hardware whose power supply is controlled by the power control circuitry, the plurality of power modes including at least a first power mode supported by the application and a second power mode not supported by the application, and a function execution unit configured to execute control of a specified function, among a plurality of functions for executing control on the plurality of pieces hardware, in accordance with an instruction from the application program, wherein the program instructs the computer to perform:
inquiring, by the function execution unit, at the power control unit for a power mode of the plurality of power modes in response to an instruction from the application program;
returning, by the power control unit, any one of the plurality of power modes to the function execution unit;
notifying, by the function execution unit, the application of the any one of the plurality of power modes when the any one of the plurality of power modes indicates the first power mode; and
notifying, by the function execution unit, the power control unit of a recovery request for powering ON a piece of hardware that has been powered OFF in the any one of the plurality of power modes without notifying the application of the any one of the plurality of power modes when the any one of the plurality of power modes indicates the second power mode and when a control instruction to the piece of hardware that has been powered OFF in the any one of the plurality of power modes is received from the application program.

16. The non-transitory computer-readable storage medium according to claim 15, wherein the notifying includes notifying the power control unit that the application program does not support the any one of the plurality of power modes.

17. The non-transitory computer-readable storage medium according to claim 15, wherein the program instructs the computer to further perform causing, by the function execution unit, the piece of hardware to execute a control instruction after the piece of hardware has been powered ON when the control instruction is received from the application program, the control instruction being for powering OFF the piece of hardware when the any one of the plurality of power modes indicates the second power mode.

18. The non-transitory computer-readable storage medium according to claim 15, wherein the program instructs the computer to further perform selecting, by the power control unit, one of the plurality of power modes that include a standby mode where power supply to an operating unit and a printing unit for performing printing is in an ON state, a first power saving mode where power supply to the operating unit and the printing unit is in an OFF state, and a second power saving mode where power supply to the operating unit is in the ON state and power supply to the printing unit is in the OFF state, wherein
the first power mode includes one of the standby mode and the first power saving mode and the second power includes the second power saving mode, and
the program instructs the computer to further perform notifying, by the power control unit, the application program that the any one of the plurality of power modes is the standby mode when the any one of the plurality of power modes is the second power saving mode.

19. The non-transitory computer-readable storage medium according to claim 15, wherein
the program instructs the computer to further perform:
receiving, by a first piece of hardware out of the plurality of pieces of hardware, an operation from a user to operate the information processing apparatus; and
executing, by a second piece of hardware out of the plurality of pieces of hardware, the specified function, and
the second power mode indicates that the first piece of hardware has been powered ON and that the second piece of hardware has been powered OFF.

20. The non-transitory computer-readable storage medium according to claim 19, wherein
the information processing apparatus is configured to form an image,
the first piece of hardware is an operation panel, and
the second piece of hardware is one of a printing unit and a scanning unit.

* * * * *